Patented Apr. 29, 1930

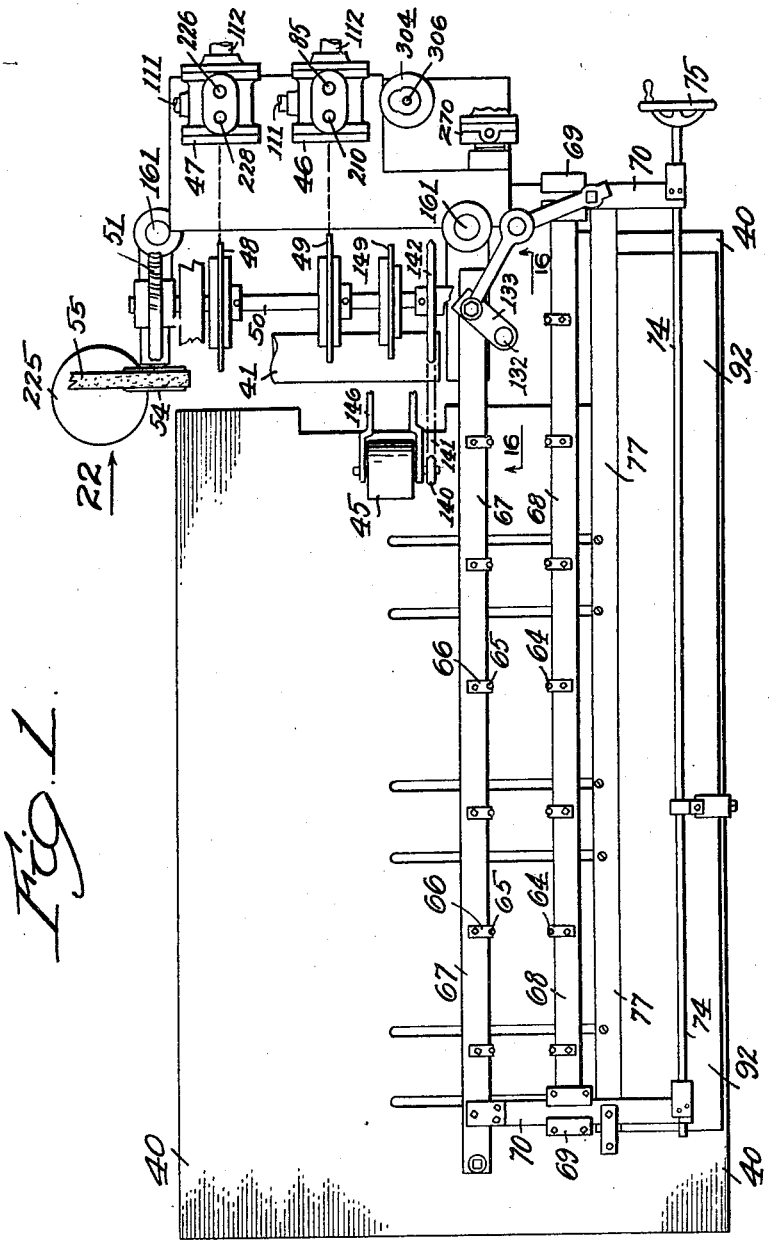

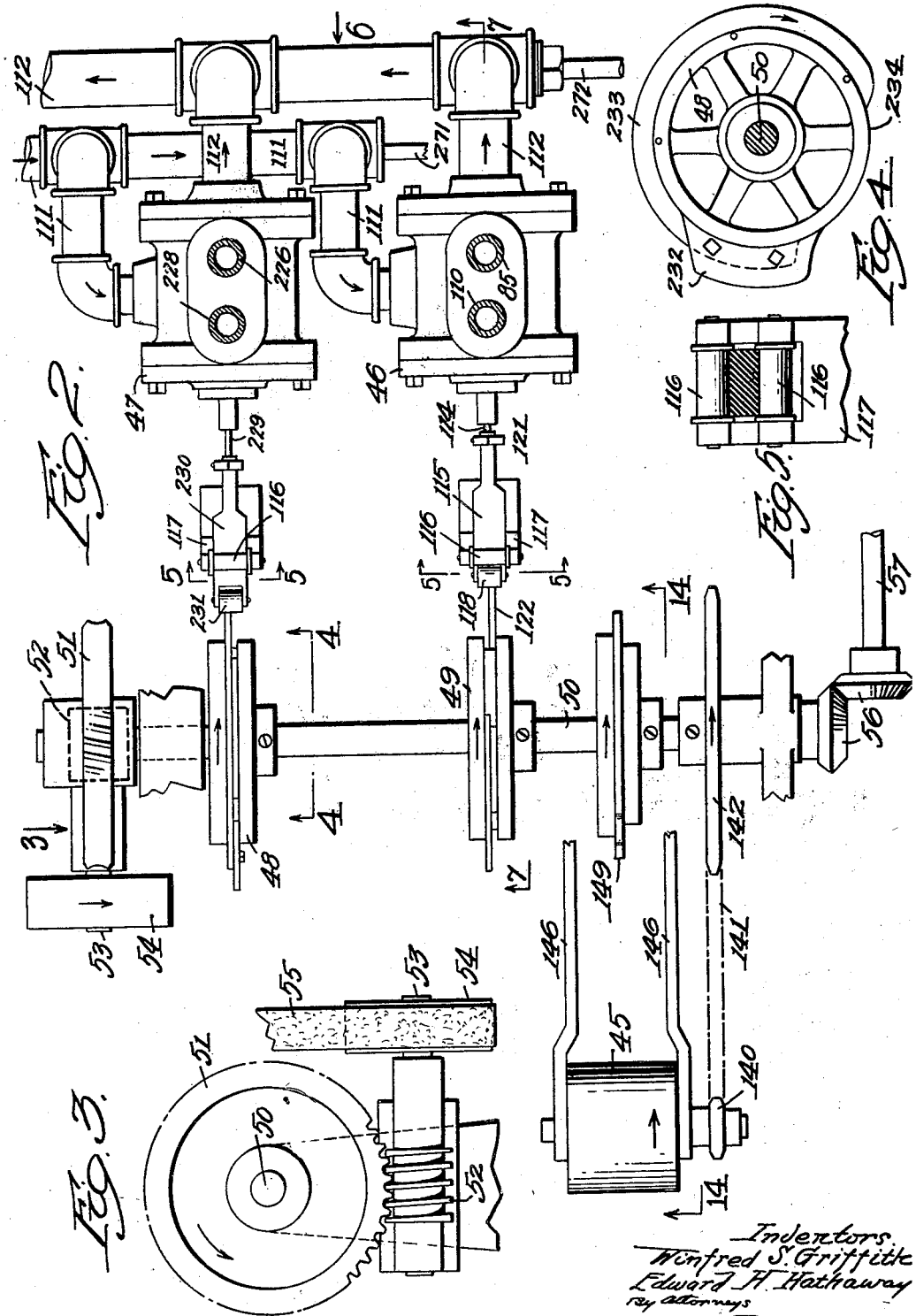

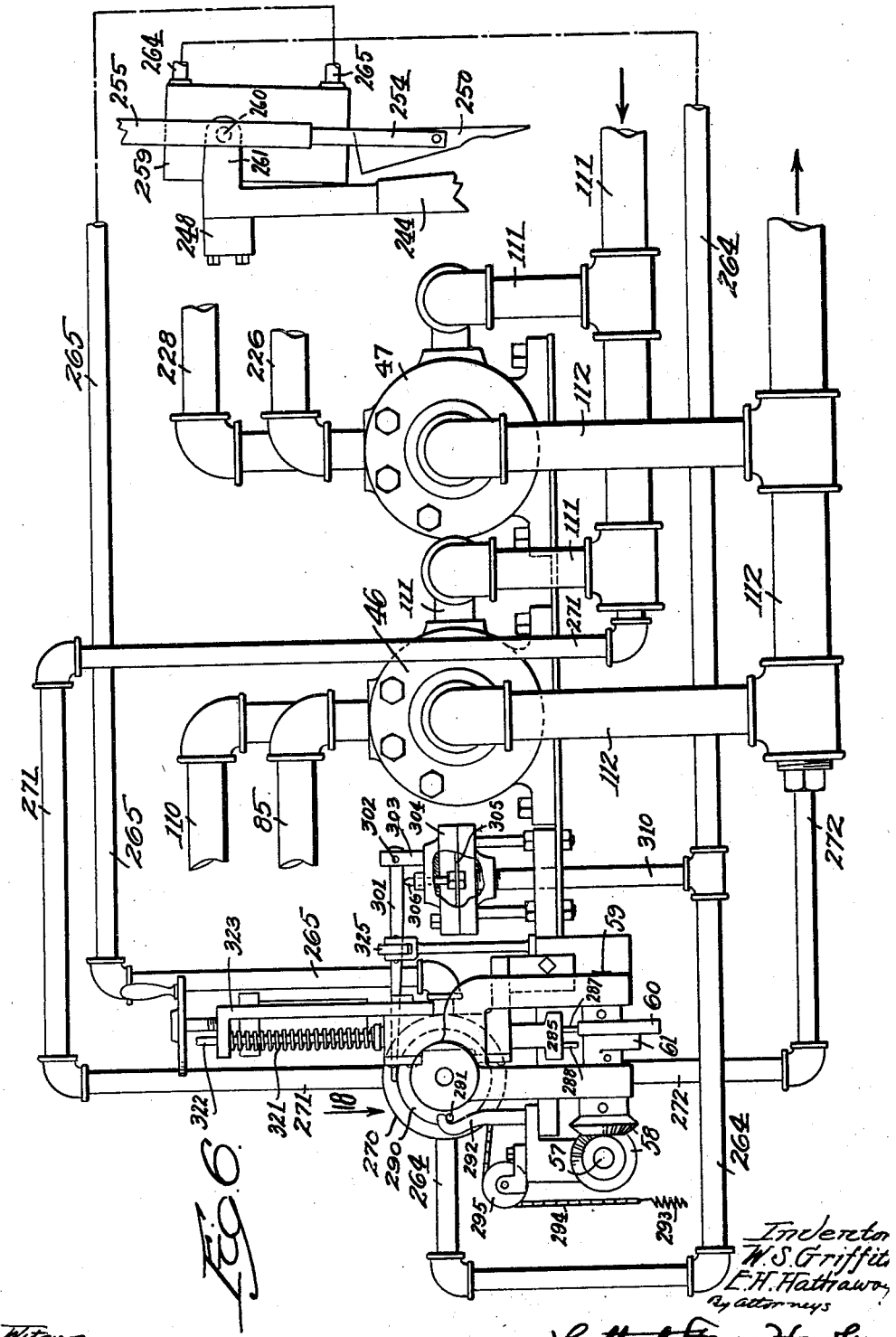

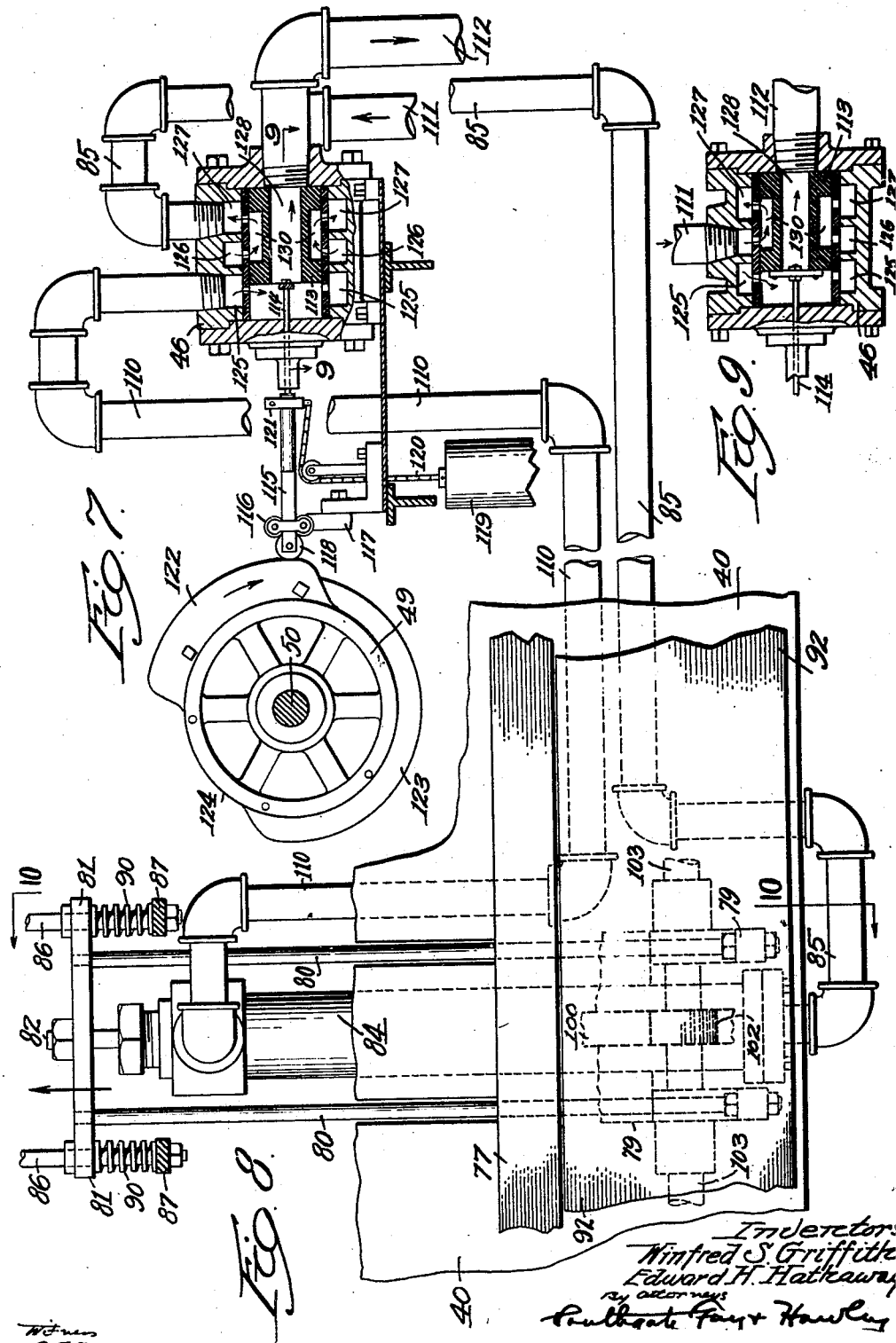

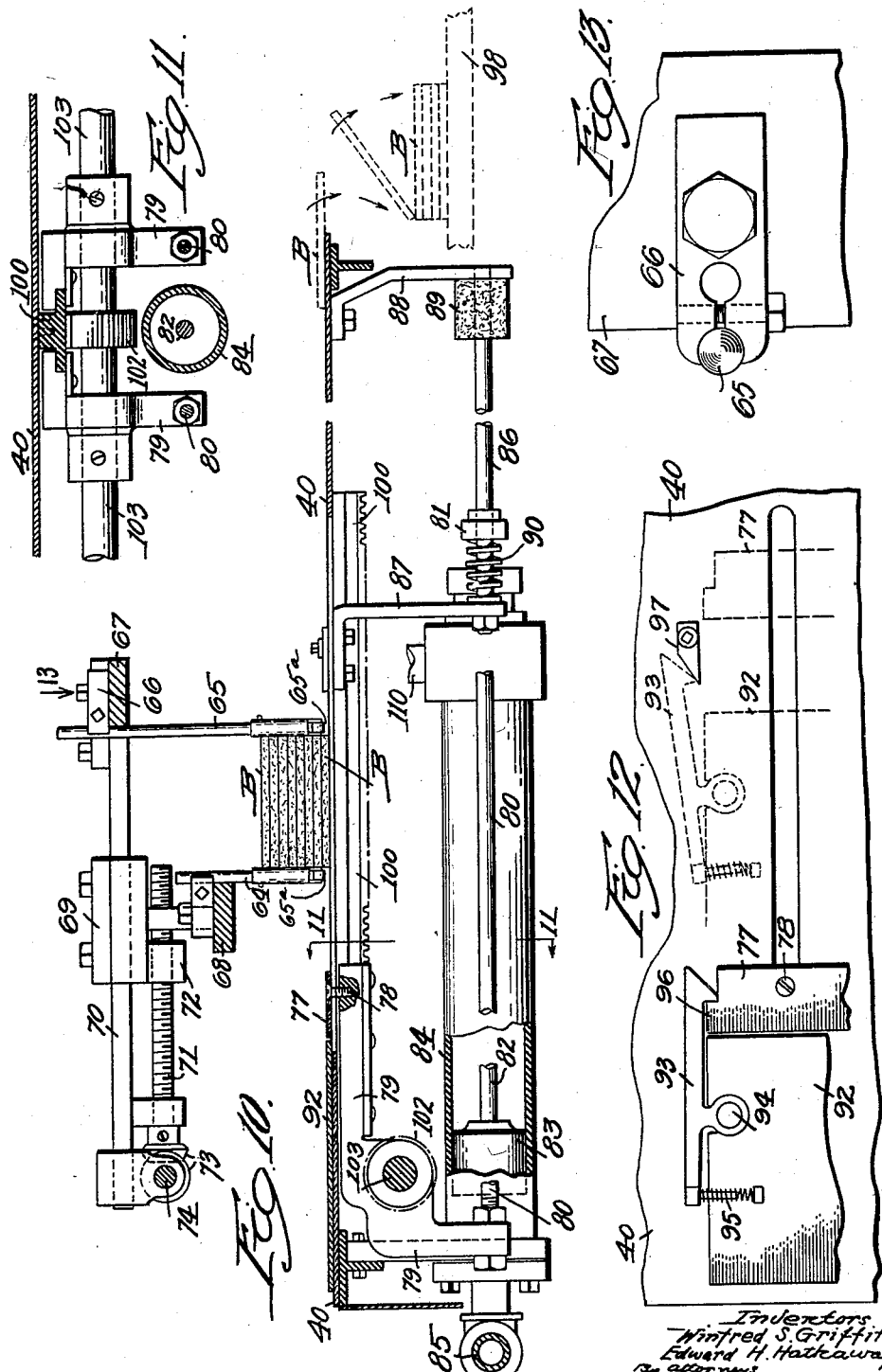

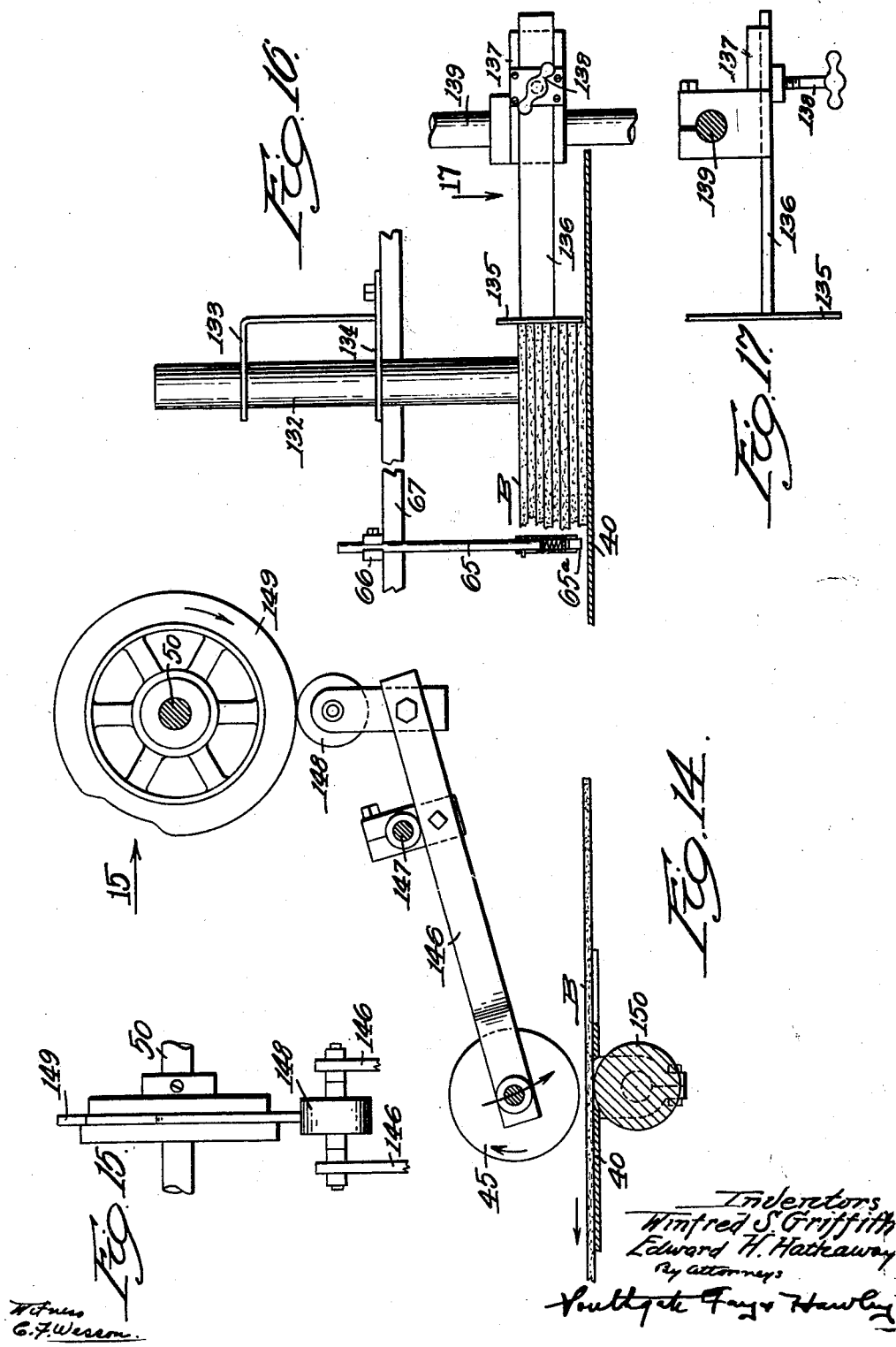

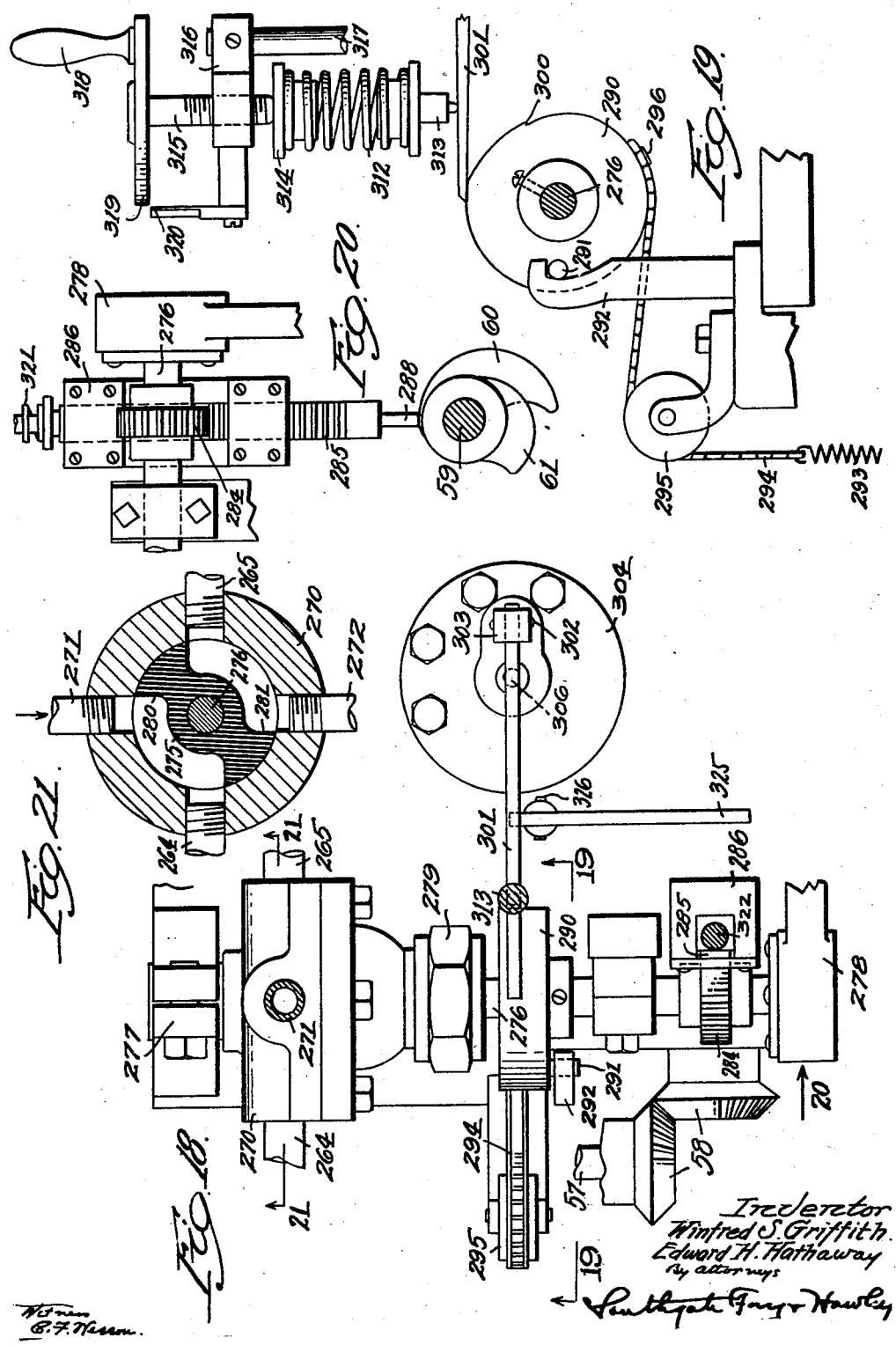

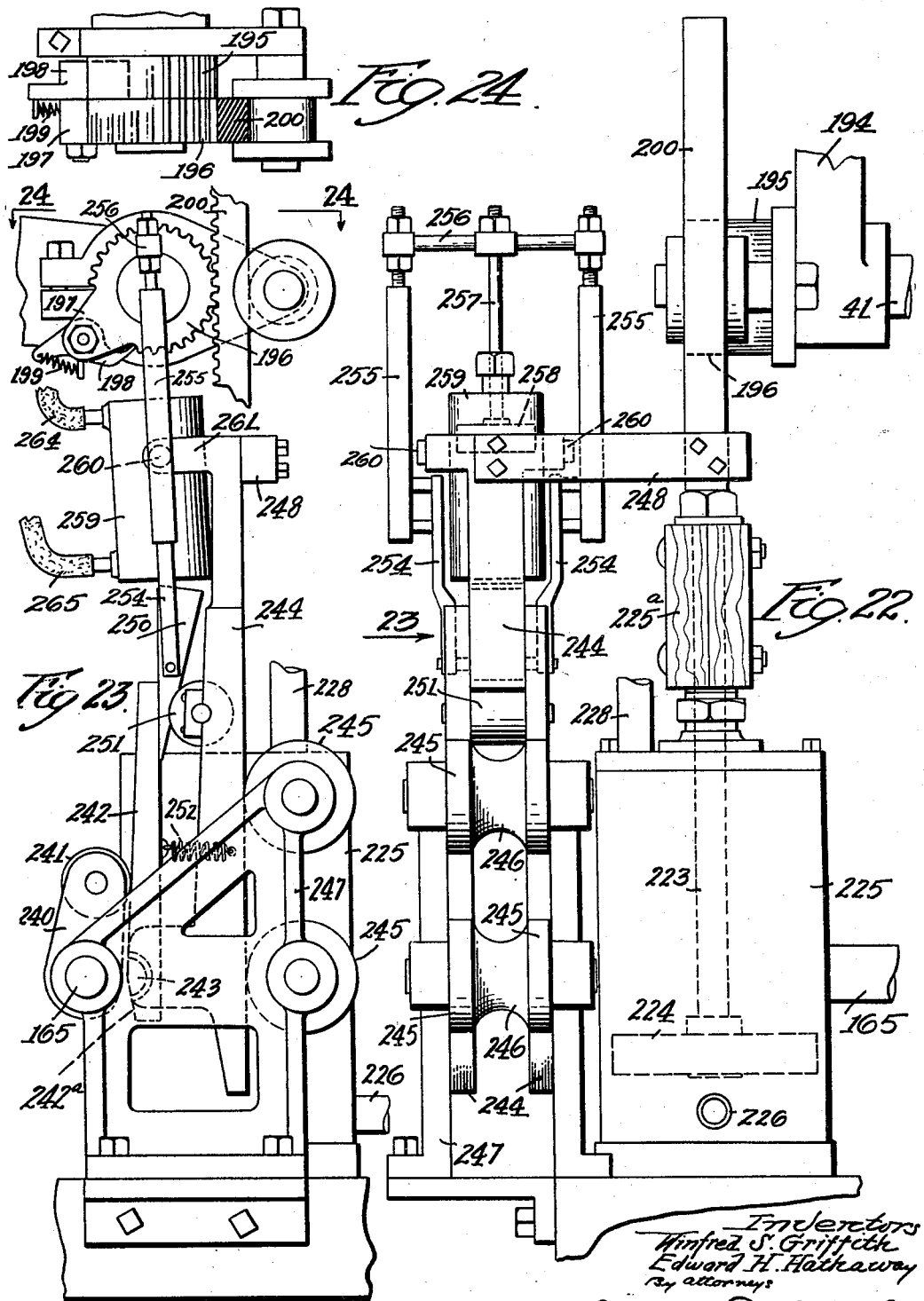

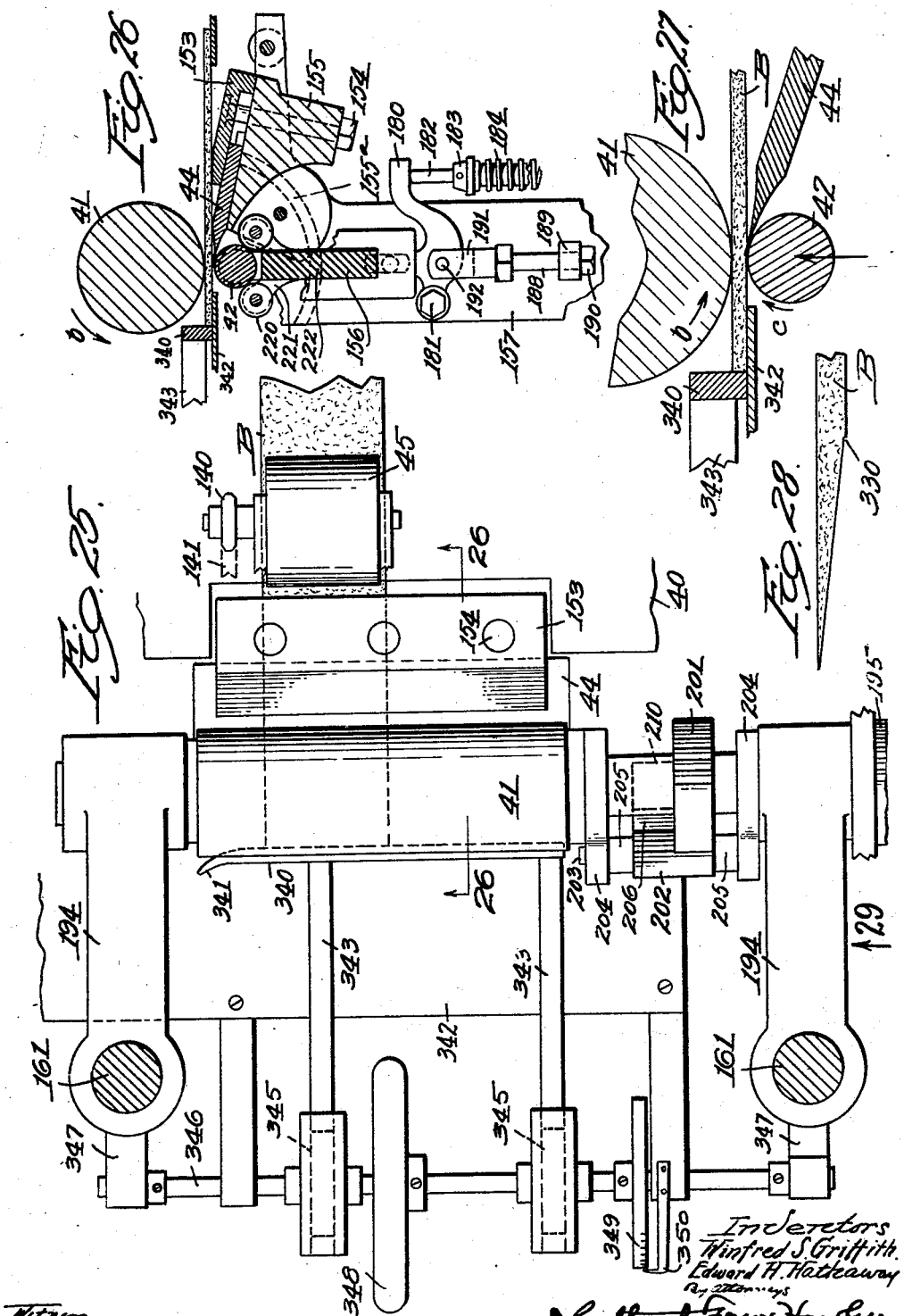

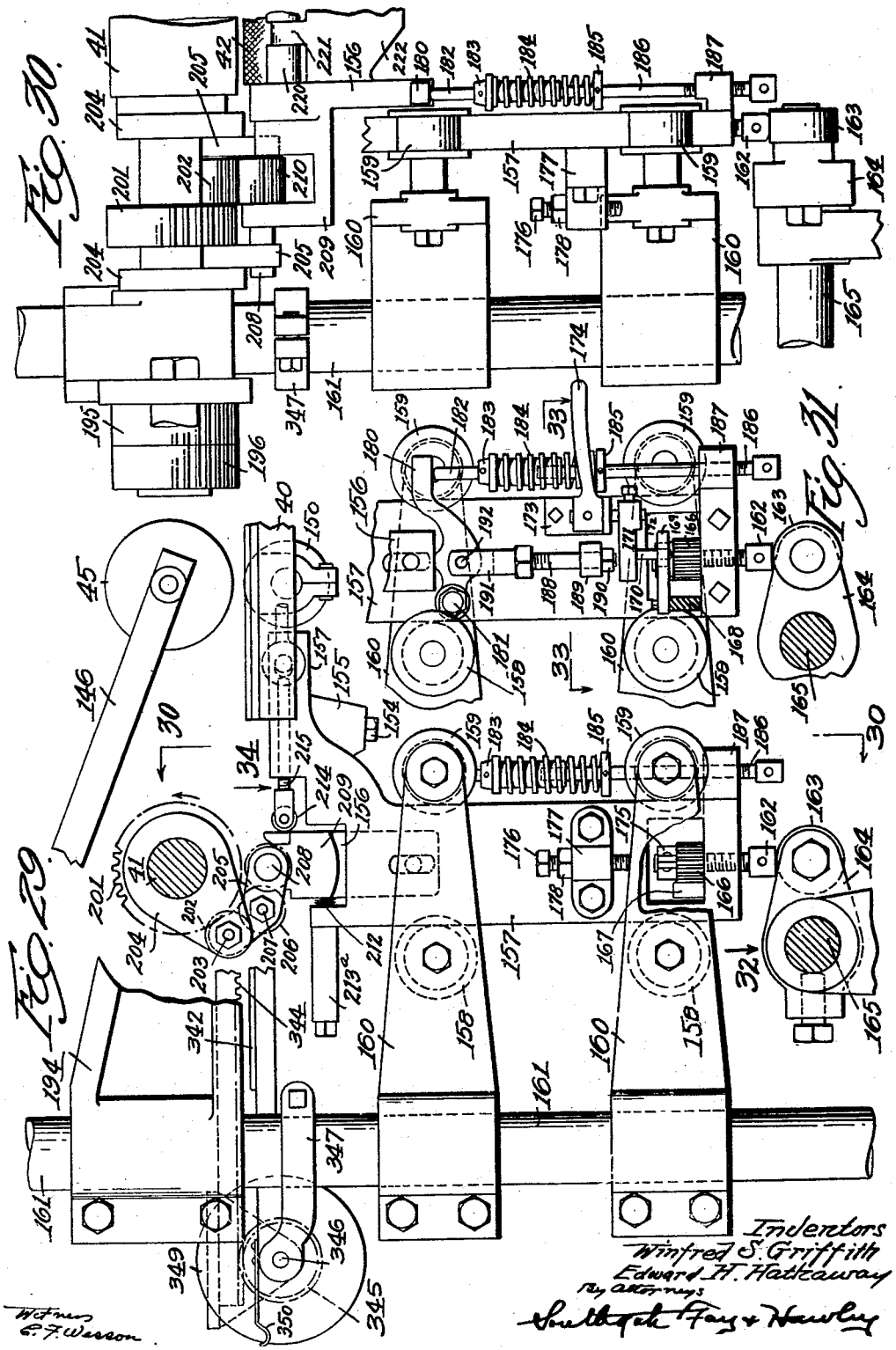

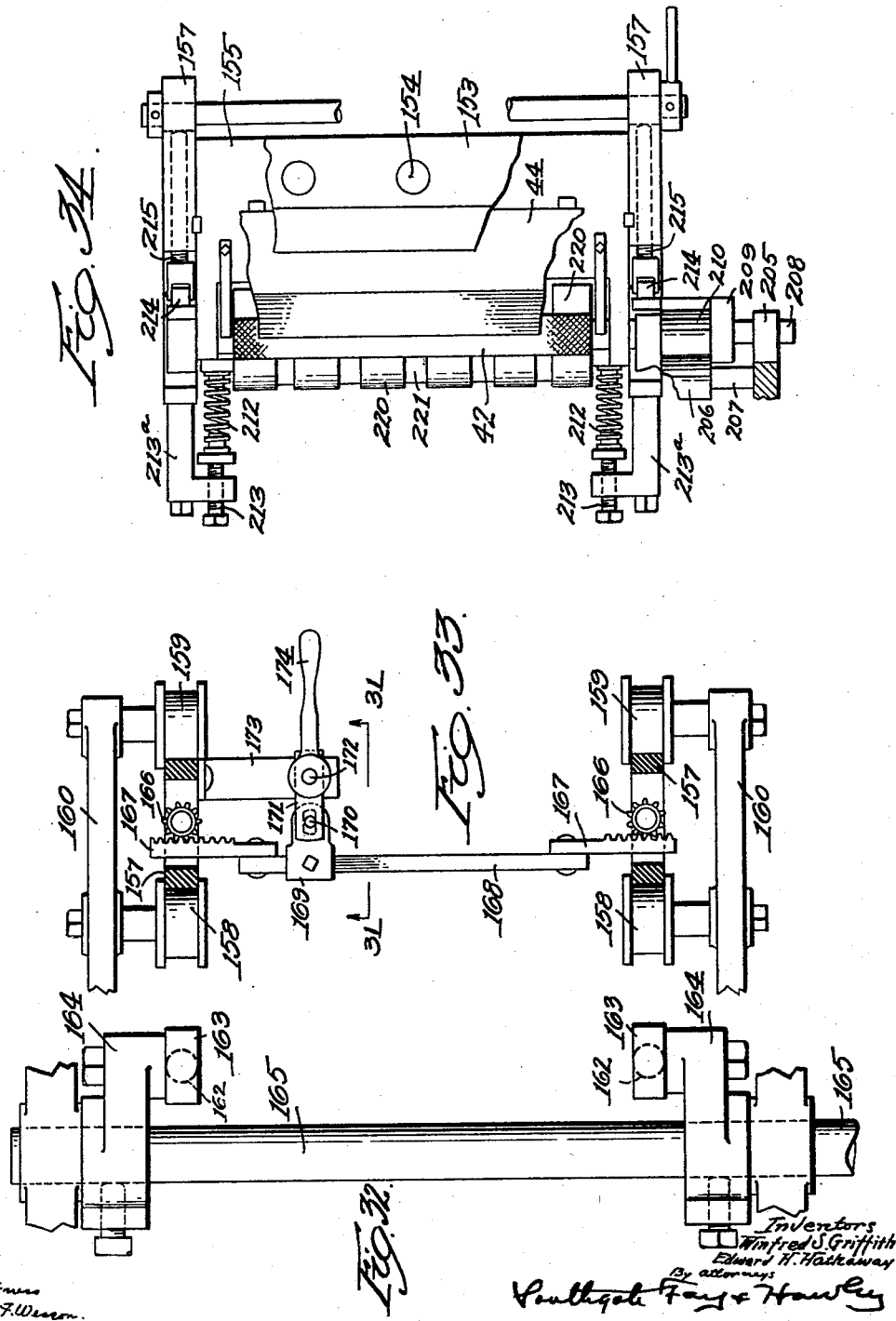

1,756,640

UNITED STATES PATENT OFFICE

WINFRED S. GRIFFITH, OF WORCESTER, MASSACHUSETTS, AND EDWARD H. HATHAWAY, OF APPONAUG, RHODE ISLAND, ASSIGNORS TO GRATON & KNIGHT COMPANY, OF WORCESTER, MASSACHUSETTS, A CORPORATION OF MASSACHUSETTS

SCARFING MACHINE

Application filed September 12, 1928. Serial No. 305,474.

This invention relates to a machine for scarfing the ends of strips of leather to form the laps in the manufacture of leather belting.

It is the general object of our invention to provide a machine in which a belt scarfing operation may be automatically performed and by which superior results may be attained.

A further object is to provide means for determining the length and inclination of the scarfing cuts. We also provide automatic means for feeding the pieces of belt to the machine, for positioning them therein, and for removing them therefrom.

An important feature of our machine relates to the provision of means for causing the scarfing knife to make a slight abrupt incision at the beginning of the scarfing cut, thus providing a seat for the thin edge of the corresponding scarfed end of the piece of belt assembled therewith.

Our invention further relates to arrangements and combinations of parts which will be hereinafter described and more particularly pointed out in the appended claims.

A preferred form of the invention is shown in the drawings in which

Fig. 1 is a plan view of our improved scarfing machine, with certain parts omitted for the sake of clearness;

Fig. 2 is an enlarged plan view of the operating mechanism shown at the right in Fig. 1;

Fig. 3 is a side elevation of certain driving mechanism, looking in the direction of the arrow 3 in Fig. 2;

Fig. 4 is a sectional elevation showing one of the operating cams, taken along the line 4—4 in Fig. 2;

Fig. 5 is a sectional rear elevation of one of the guides for the piston plungers, taken along the line 5—5 in Fig. 2;

Fig. 6 is a front elevation of the hydraulic mechanism and certain parts associated therewith;

Fig. 7 is a sectional side elevation of the hydraulic control and actuating mechanism for the hydraulic work table feed, taken along the line 7—7 in Fig. 2;

Fig. 8 is a plan view of the hydraulic table operating mechanism;

Fig. 9 is a sectional plan view of the table control cylinder, taken along the line 9—9 in Fig. 7;

Fig. 10 is a sectional front elevation of the work table and the mechanism for feeding work thereover, the section being taken substantially along the line 10—10 in Fig. 8;

Fig. 11 is a transverse sectional elevation, taken along the line 11—11 in Fig. 10;

Fig. 12 is a partial plan view of the work table, looking in the direction of the arrow 12 in Fig. 10;

Fig. 13 is a detail plan view of a guide rod clamping device, looking in the direction of the arrow 13 in Fig. 10;

Fig. 14 is a sectional side elevation of mechanism for withdrawing pieces of leather after the scarfing operation, taken along the line 14—14 in Fig. 2;

Fig. 15 is a rear view of an actuating cam and cam roll therefor, looking in the direction of the arrow 15 in Fig. 14;

Fig. 16 is a partial sectional side elevation of certain guiding and positioning devices on the work table, the section being taken along the line 16—16 in Fig. 1;

Fig. 17 is a plan view of certain parts shown in Fig. 16, looking in the direction of the arrow 17 in said figure;

Fig. 18 is a plan view of the main control valve and parts associated therewith, looking in the direction of the arrow 18 in Fig. 6;

Fig. 19 is a front elevation of certain cam and control mechanism, taken along the line 19—19 in Fig. 18;

Fig. 20 is a side elevation of parts of the control mechanism, looking in the direction of the arrow 20 in Fig. 18;

Fig. 21 is a sectional front elevation of the control valve, taken along the line 21—21 in Fig. 18;

Fig. 22 is a rear elevation of the mechanism for positioning the scarfing knife and for drawing the belt past the knife, looking in the direction of the arrow 22 in Fig. 1;

Fig. 23 is a side elevation of the parts shown in Fig. 22, looking in the direction of the arrow 23 in said figure;

Fig. 24 is a detail sectional plan view, taken along the line 24—24 in Fig. 23;

Fig. 25 is a plan view of the scarfing knife and certain work feeding and guiding mechanism associated therewith;

Fig. 26 is a sectional side elevation of the same parts, taken along the line 26—26 in Fig. 25;

Fig. 27 is an enlarged sectional side elevation illustrating the operation of the scarfing knife;

Fig. 28 is a sectional side elevation of a portion of a belt after the scarfing operation has been performed thereon;

Fig. 29 is a side elevation of the knife carriage and certain feeding and actuating mechanism associated therewith, looking in the direction of the arrow 29 in Fig. 25 and with certain shafts shown in section;

Fig. 30 is a rear elevation of certain parts shown in Fig. 29, taken along the line 30—30 in said figure;

Fig. 31 is a sectional side elevation of certain adjusting and tensioning mechanism, taken along the line 31—31 in Fig. 33;

Fig. 32 is a plan view of the rock shaft for positioning the scarfing knife, looking in the direction of the arrow 32 in Fig. 29;

Fig. 33 is a sectional plan view of certain tension adjusting mechanism, taken along the line 33—33 in Fig. 31; and Fig. 34 is a plan view of the scarfing knife and certain parts associated therewith, looking in the direction of the arrow 34 in Fig. 29.

General construction and operation

Our improved scarfing-machine comprises a table 40 (Fig. 1) and table feeding mechanism for moving pieces of belting singly to scarfing position and for thereafter removing the pieces of belting and eventually pushing them over the further edge of the table 40. The end of the belt to be scarfed is gripped between feeding rollers 41 and 42 (Fig. 27) and is forced rearward or to the right in said figure against the inclined edge of the scarfing knife 44. After the scarfing operation, the end of the belt presents the appearance indicated in Fig. 28. The belt is then withdrawn by a positively driven roll 45 (Figs. 1 and 2) and is thereafter pushed toward the further side of the table 40 by the table feed mechanism previously mentioned.

The belt feeding mechanism and the scarfing mechanism are hydraulically operated and are controlled by suitable valves in valve casings or cylinders 46 and 47 (Fig. 1), the valves being actuated by cams 48 and 49 on a cam shaft 50, having a worm wheel 51 (Fig. 3) engaged by a worm 52 on a short shaft 53, provided with a driving pulley 54 rotated by a belt 55 from any suitable source of power.

The shaft 50 is connected by bevel gears 56 (Fig. 2) to an intermediate shaft 57, which in turn is connected by bevel gears 58 to a short shaft 59 on which certain cams 60 and 61 are mounted. These cams control the operation of a four-way valve (Figs. 18 and 19) by which the movements of the scarfing knife are determined.

The entire operation of the machine is automatic and it is merely necessary to provide the pieces of belt in suitable piles for the table feed, and to adjust the mechanism to provide the desired length and angle of scarfing out, after which the machine will operate on successive pieces of belt without further attention.

Table feeding mechanism

The mechanism for presenting pieces of belt singly in scarfing position will be first described. The pieces of belt B are piled on the table 40 (Fig. 10) between two series of guide-pins 64 and 65. The pins 65 are adjustable vertically in clamps or brackets 66 (Fig. 13) bolted to the upper side of a frame member 67. The front guide-pins 65 are adjusted vertically so as to permit a single thickness of belt only to be pushed out thereunder. Spring-pressed rollers 65ª may be provided at the lower ends of the pins 65, which rollers may be adjusted closer to the table 40 than rigid pins, as they will yield slightly when the leather is pushed thereunder.

The rear guide-pins 64 are similarly clamped to a cross-bar 68 (Fig. 10) supported on blocks 69 slidable on guideways 70. Adjusting screws 71 are threaded in depending projections 72 on the blocks 69 and are connected by bevel gears 73 to a shaft 74 (Fig. 1) extending lengthwise of the table and having a hand-wheel 75 by which it may be rotated to move the blocks 69 at the two ends of the table simultaneously forward or rearward to cause the rear guide-pins 64 to closely engage the particular width of belt to be scarfed.

A feed plate 77 (Fig. 10) is slidable on the table 40 and is connected by screws 78 to a slidable support or frame member 79. The member 79 is connected by guide-rods 80 (Fig. 8) to a cross bar 81 secured to a piston rod 82. A piston 83 (Fig. 10) is mounted on the rod 82 and is slidable in a cylinder 84. Oil under pressure is admitted at the left hand end of the cylinder 84 through a supply pipe 85 (Figs. 8 and 10). The piston then advances, giving the feed plate 77 a feeding movement.

The cross-bar 81 (Fig. 8) is slidable on fixed guide-rods 86 (Fig. 10) supported by brackets 87 and 88 on the under side of the table 40. Yielding collars 89 and springs 90 are provided to cushion the cross-bar at its opposite limits of travel.

A supporting plate 92 (Figs. 10 and 12)

is mounted alongside and behind the feed plate 77 and is normally locked to the feed plate by latches 93, pivoted at 94 on the supporting plate 92 and held yieldingly in latching position by springs 95. The hook-shaped rearward ends of the latches 93 (Fig. 12) engage shoulders 96 on the ends of the feed plate 77 and the supporting plate is thus drawn forward with the feed plate during the first part of its feed movement.

The forward edge of the feed plate engages the lowermost piece of belt B in the pile between the guide-pins 64 and 65 and carries it rearward under the pins 65. The remaining portion of the pile feeds downward as soon as the lowermost piece of belt is removed and rests upon the supporting plate 92. When the plate 92 reaches its supporting position under the pile of belts B, the latches 93 engage fixed cam lugs or stops 97 (Fig. 12) by which they are forced outward and are disengaged from the end projections 96 of the feed plate 77.

The supporting plate then remains under the pile of belts while the feed plate advances the lowermost piece of belt to scarfing position. As the feed plate returns, the supporting plate is automatically locked thereto for further movement thereby.

Belt removing

As each fresh piece of belt is fed along the table 40, it engages the previously fed and scarfed belt, forcing it intermittently rearward until it falls over the rear edge of the table, inverting itself as it falls and coming to rest in a pile of stock on a lower support 98 (Fig. 10). The inverted belts may then be reversed lengthwise and may be replaced on the table for scarfing the opposite ends thereof.

As the feed plate 77 and supporting plate 92 are of considerable length, I have made special provision for preventing cramping of these plates as they move forward and rearward. For this purpose rack bars 100 (Figs. 10 and 11) are secured in fixed positions beneath the table 40 and are engaged by pinions 102 (Fig. 11) on a squaring shaft 103, rotatable in bearings in the sliding supports or frame members 79. As the feed plate 77 and its frame members 79 are moved rearward, the shaft 103 is rotated in engagement with all of the racks 100, thus holding the feed plate in alignment and perpendicular to its path of travel. The rack bars 100 are flanged to provide guides for the members 79, as shown in Fig. 11.

Hydraulic mechanism for table feed

The feed plate 77 is actuated by the piston 83 (Fig. 10) in the cylinder 84, as previously described. Oil is supplied to the front end of the cylinder for belt feeding movement through a pipe 85 (Fig. 8) and oil escapes from the rear end of the cylinder through a pipe 110 during such feeding movement of the plate 77.

The pipes 85 and 110 are connected to ports in the top of the control valve cylinder 46 (Fig. 7). A supply pipe 111 is connected to a port in the side of said cylinder and an exhaust pipe 112 is connected to a port in the front end of said cylinder.

A hollow piston valve 113 (Fig. 7) is slidable in the cylinder 46 and is connected by a piston rod 114 to a sliding member 115 supported between guide-rolls 116 (Fig. 5) in a fixed frame member 117. A cam roll 118 is mounted in the outer end of the sliding member 115 and is engaged by the cam 49 on the main shaft 50, as previously described.

A weight 119 (Fig. 7) is connected by a chain 120 to a collar 121 on the member 115 and acts to move the piston valve 113 to the left in Fig. 7 and to hold the roll 118 firmly seated against the cam 49. The rotating cam 49 has a raised or feeding portion 122, an intermediate or neutral portion 123, and a depressed portion 124. The cylinder 46 is provided with annular passages 125, 126 and 127 (Fig. 7), each connected by ports to the interior of the cylinder, the passage 125 being connected to the rear feed cylinder pipe 110, the passage 126 being connected to the inlet pipe 111 and the passage 127 to the front feed cylinder pipe 85.

An axial opening 128 (Fig. 7) through the piston valve 113 forms a connection to the exhaust pipe 112 when the piston is in its right hand or belt feeding position. The piston valve 113 also has an annular groove or recess 130 in the periphery thereof. When the raised portion 122 of the cam 49 pushes the piston valve 113 to the right, the supply pipe 111 is connected through the annular passage 126, the piston recess 130, and the annular passage 127 to the front cylinder connection 85, and the back cylinder connection 110 is connected through the annular passage 127, cylinder 46, and axial passage 128 to the exhaust pipe 112, thus causing the piston 83 to be advanced on its feeding stroke. The raised cam portion 122 is made of such length as may be necessary to give the desired feeding stroke.

After the portion 122 leaves the cam roll 118, the roll 118 is moved by the weight 119 to engage the neutral portion 123 of the cam, in which position the ports from the cylinder 46 to the annular passages 125 and 127 are closed, thus preventing movement of the feeding cylinder piston 83 in either direction.

When the low part 124 of the cam is reached, the piston valve 113 will be moved by the weight 119 to the left hand end of the cylinder, connecting the inlet 111 to the back connection 110 and connecting the front connection 85 to the exhaust 112, thus causing return movement of the feeding plate 77.

The fluid under pressure for operating the hydraulic mechanism may be supplied from any suitable source and at any desired pressure.

A heavy cylindrical rod or weight 132 (Fig. 16) is mounted in guides 133 and 134 on the frame member or cross-bar 67 and rests freely on the ends of the belts adjacent the scarfing mechanism. This weight insures downward movement of the stack of belts each time a belt is removed from the bottom thereof.

An end guide or stop plate 135 (Figs. 16 and 17) is mounted on a supporting bar 136 slidable in a guideway 137, and a binding screw 138 is provided for securing the stop plate in adjusted position. The guideway 137 is clamped to a fixed vertical rod or support 139 in any desired vertical position.

I have thus provided cam controlled, hydraulically operated mechanism for advancing the lowermost pieces of belting successively to scarfing position and for supporting the remaining stock of belts until the return movement of the feed plate 77 is completed. Furthermore, the same feeding mechanism acts to push the scarfed belts successively onward until they fall from the table onto a suitable support, inverting themselves as they fall, so that they are ready for the second scarfing operation on the opposite side and at the opposite end of the belts.

The feeding mechanism is readily adjusted for belts of different widths by turning the hand wheel 75 to locate the front guide-pins 64 at proper distances from the rear guide-pins 65.

Belt withdrawing mechanism

The driven roll 45 (Figs. 1, 2 and 14) is provided for withdrawing the belt after the scarfing operation is completed and before the next succeeding belt feeding operation. The roll 45 is connected by a sprocket 140 (Fig. 2) and chain 141 to a large sprocket 142 on the main or cam shaft 50 and is continuously rotated thereby. The roll 45 is pivotally mounted in arms 146 swinging about a fixed pivot 147 (Fig. 14) and carrying a roll 148 engaging a cam 149 on the shaft 50. The cam normally holds the roll raised above the belt B but releases the roll once during each rotation of the cam shaft, allowing the roll to drop and engage the belt and to thus withdraw it from scarfing position. An idle roll 150 is positioned in an opening in the table 40 just below the roll 145 and co-operates with the roll in the withdrawing operation.

Scarfing mechanism

The scarfing operation is performed by a knife 44 (Fig. 27) in co-operating with the feed rolls 41 and 42 which positively draw the belt to the right in Fig. 27 against the edge of the scarfing knife. The knife 44 is preferably concave toward its cutting edge on both upper and lower surfaces, as indicated in Fig. 27, and is secured by a clamping bar 153 (Fig. 26) and bolts 154 to an inclined upper surface on a support 155, adjustably mounted in segmental guideways 155ª in a knife stand or carriage 156.

The knife carriage 156 is slidable in vertical guideways in frame members 157 (Fig. 29) which in turn are vertically movable between guide rolls 158 and 159, arranged in upper and lower pairs on brackets 160, clamped to fixed supports or posts 161. Abutment screws 162 on the frame members 157 engage rolls 163 on arms 164 secured to a rock shaft 165. The mechanism for actuating the rock shaft will be hereinafter described.

Pinions 166 (Figs. 29 and 33) are keyed to the abutment studs 162, which studs are threaded in the lower ends of the frame members 157. The pinions 166 are engaged by rack bars 167 (Fig. 33), which rack bars are connected by a link 168 on which is secured a collar 169, slotted to receive a stud 170 in an arm 171 (Fig. 31) secured on the lower end of a stud 172 pivoted in a bracket 173 (Fig. 33) and having a handle 174 secured thereto. Collars 175 (Fig. 29) are clamped to the studs 162 above the pinions 166, preventing upward displacement thereof.

Vertical adjustments of the scarfing knife may be made by moving the hand lever 174 to the right or left as viewed in Fig. 33. The extreme downward movement of the frame members 157 is limited by set screws 176 (Fig. 29 and 30) threaded in lugs 177 projecting from the members 157, said screws engaging the top edges of the lower brackets 160. Lock nuts 178 are provided to preserve the adjustment of the set screws 176.

Knife carriage support

The knife carriage 156 is supported in the frame members 157 by levers 180 (Figs. 26 and 31) pivoted at 181 on the members 157 and engaging the lower ends of the sides of the knife carriage 156. The outer ends of the levers 180 are engaged by spring plungers 182 (Fig. 30) having heads 183 seated on the upper ends of heavy coiled springs 184. Similar seats 185 support the lower ends of the springs and are formed on the upper ends of rods or supports 186, threaded in lugs 187 offset from the lower ends of the frame members 157. By turning the rods 186 upward or downward, the spring pressure on the knife carriage may be adjusted.

Upward movement of the levers 180 is limited by threaded studs 188 (Fig. 31) extending freely through lugs 189 on the sides of the frame members 157 and having nuts 190 engaging the lower faces of the lugs 189 to limit upward movement of the studs. U-shaped clips or hangers 191 are secured to the upper ends of the studs 188 and are pivoted at 192 to the levers 180, thus limiting upward movement thereof.

Feed roll mechanism

The upper feed roll 41 is mounted in fixed bearings in arms 194 (Figs. 25 and 29) clamped to the upright posts 161 previously described. The roll 41 is provided with a ratchet wheel 195 (Fig. 24) keyed to its shaft, and with a gear 196 loose thereon. The gear 196 is provided with an offset arm 197 (Fig. 23) having a pivotally supported pawl 198 which is held in yielding engagement with the ratchet wheel 195 by a spring 199. The gear 196 is engaged by a rack bar 200 which is vertically and intermittently reciprocated by actuating mechanism to be described.

As the rack bar 200 moves upward, it rotates the gear 196 and the pawl 198 thereon causes the ratchet wheel 195 to rotate therewith, thus advancing the feed roll 41 in the direction of the arrow $b$ in Figs. 26 and 27. When the rack bar 200 moves downward, the pawl 198 slips idly over the teeth of the ratchet wheel 195, so that the ratchet wheel is rotated intermittently in one direction only.

A gear 201 (Figs. 25 and 30) on the shaft of the feed roll 41 engages a long pinion 202 rotatable on a stud 203 (Fig. 29) mounted in arms 204 which swing loosely about the axis of the feed roll 41. A second pair of arms 205 (Figs. 29 and 30) are pivoted to swing about the stud 203 and support an intermediate or idle pinion 206 mounted on a stud 207 in the arms 205. The lower ends of the arms 205 are pivoted on the end of the lower feed roll shaft 208 (Fig. 30), which is mounted in bearing brackets 209 on the ends of the knife carriage 156.

The lower feed roll 42 is mounted on the intermediate portion of the shaft 208, and a pinion 210 is secured to said shaft and engages the intermediate pinion 206 (Fig. 29). The lower feed roll 42 is thus positively geared to the upper feed roll 41 and rotates in unison therewith but in the direction of the arrow $c$ of Fig. 27. The swinging gear connection above described permits the positive drive of the lower feed roll in every vertical position thereof.

Side-play of the knife carriage 156 is yieldingly restrained by springs 212 (Figs. 29 and 34) adjustable by screws 213 threaded in brackets 213$^a$ (Fig. 34) projecting from the slidable frame 157. The springs force the carriage 156 to the right, into engagement with supporting rolls 214 (Fig. 29) mounted on studs 215 threaded in the slidable frame 157.

Idle rolls 220 (Figs. 26, 30 and 34) are mounted in bearings 221 spaced along the upper edge of the middle portion 222 of the carriage 156. The idle rolls 220 effectively prevent downward displacement of the lower feed roll 42, which is necessarily of relatively small diameter.

Hydraulic feed roll operating mechanism

As previously stated, the upper large feed roll 41 is intermittently rotated in one direction through the ratchet wheel 195 and pawl 198 (Fig. 24) by the gear 196 actuated by the reciprocating rack bar 200. The rack bar 200 is directly connected (Fig. 22) to a rod 223 provided with a piston 224 vertically slidable in a hydraulic cylinder 225. A spacing collar 225$^a$ limits downward movement of the rack bar and piston.

The lower end of the cylinder 225 is connected by a pipe 226 to a port in the upper front portion of the control valve cylinder 47 (Fig. 2) previously described, and the upper end of the cylinder 225 is connected by a pipe 228 to the upper rear portion of the valve cylinder 47.

The construction and operation of the valve mechanism in the cylinder 47 is similar to that in the cylinder 46 previously described, and the hollow piston valve is actuated by a valve rod 229 having a rod head 230 carrying a roll 231 and slidable between guide-rolls 116 (Fig. 5) all as previously described.

The roll 231 engages a control cam 48 (Fig. 4) which is provided with a raised portion 232, and intermediate or neutral portion 233, and a low portion 234. The raised cam portion 232 actuates the piston valve to admit oil to the pipe 226 connected to the lower end of the cylinder 225, forcing the cylinder upward and giving the feed roll 41 its operative or feeding movement. The low cam portion 234 reverses the connection, admitting oil above the piston 224 through the pipe 228 and thus returning the piston to its lower position. The cam roll 231 then engages the intermediate portion 233, which holds the piston valve in neutral position for something more than half a revolution of the cam shaft, during which period the table feed and knife-setting mechanism operate.

Knife carriage operating mechanism

The mechanism for raising the knife carriage 156 and its supporting frame 157 (Fig. 29) is actuated by a direct connection from the feed roll operating mechanism above described.

As previously stated, the knife frame 157 is raised by a rock shaft 165 (Fig. 29), acting through rolls 163 which engage abutment studs 162 in the lower ends of the frame 157.

The shaft 165 (Fig. 23) is provided with an arm 240 having a roll 241 engaged by a cam plate 242. The plate 242 is pivoted at its lower end at 243 to vertically sliding members 244 having their straight vertical right hand faces, (as viewed in Fig. 23), engaging spaced cylindrical surfaces 245 on rollers 246 mounted in a fixed frame 247.

The upper ends of the members 244 are connected by a cross bar 248 to the lower end of the rack bar 200, so that the members 244 are vertically reciprocated with said rack bar.

The upper end of the cam plate 242 is supported by a wedge 250 (Fig. 23) interposed between the plate 242 and a roll 251, rotatably mounted on the sliding member 244. As the wedge 250 is raised or lowered, the inclination of the cam plate 242 is varied and the greater the inclination of the cam plate the more rapid will be the angular movement of the rock shaft 165, as the cam plate 242 moves upward past the cam roll 241 on the arm 240. The wedge 250 has a recess near its small end, to receive the roll 251 when in extreme raised or idle position.

A spring 252 (Fig. 23) holds the cam plate firmly in engagement with the wedge 250.

As the rack bar 200 moves upward and actuates the feed rolls to draw the belt positively against the edge of the scarfing knife, the cam plate 242 is moved upward by the connections described, rocking the shaft 165 and thus positioning the scarfing knife vertically and raising the lower feed roll to grip the belt. The extreme lower end of the cam plate 242 is inclined away from the roll 241 as indicated at 242ª, Fig. 23.

*Wedge positioning mechanism*

The wedge 250 is pivoted between arms 254 (Fig. 22 and 24) secured to the lower ends of rods 255, the upper ends of which are adjustably secured in a cross bar 256, which in turn is mounted on the upper end of a piston rod 257, provided with a piston 258 slidable in a cylinder 259 mounted on trunnions 260 in arms 261 (Fig. 24) projecting laterally from the sliding frame members 244.

A pipe 264 is connected to the upper end of the cylinder 259 and a pipe 265 is connected to the lower end of the cylinder 259. As oil is admitted above or below the piston, the piston is moved to raise or lower the cross head 256 and through the connections 255 and 254 to correspondingly raise or lower the wedge 250.

Mechanism to be described is provided for determining the upward or downward movement of the piston 258 and for holding the piston in any desired intermediate position during the operative upward movement of the sliding members 244.

*Wedge cylinder controlling mechanism*

We will now describe the mechanism for controlling the admission of oil to the cylinder 259 by which the wedge 250 is vertically positioned.

The pipes 264 and 265 are connected to the opposite sides of a four-way valve casing 270 (Figs. 18 and 21). A supply pipe 271 at the top of the casing is connected to the main inlet pipe 111 previously described and a pipe 272 at the bottom of the casing 270 is connected into the exhaust pipe 112 previously described.

A valve 275 (Fig. 21) is rotatably mounted in the casing 270 and is supported on a valve shaft 276 (Fig. 18) having bearings 277 and 278 fixed on the frame of the machine. The valve shaft 276 is provided with a suitable stuffing box 279 where it extends out from the chamber of the casing 270. The valve 275 is provided with recessed portions 280 and 281, oppositely disposed and each adapted to connect one of the pipes 264 or 265 to the inlet 271 or to the outlet 272.

A gear 284 is fixed on the shaft 276 and is engaged by a rack bar 285 vertically slidable in a fixed guideway 286 (Fig. 20) and having a pair of studs 287 and 288 (Fig. 6) engaging the cams 60 and 61 on the shaft 59 (Fig. 20) previously described. The shaft 59 is continuously rotated through the bevel gears 58 (Fig. 18) and 56 (Fig. 2) from the main shaft 50.

A ratchet wheel 290 is secured on the valve shaft 276 and is provided with a stop pin 291 (Fig. 19) engaged by a fixed hook or stop 292 to limit movement of the control valve 275 in one direction. The pin 291 is normally held in contact with the stop 292 by a spring 293, acting on a chain or cord 294 which passes over a guide-pulley 295 and is attached at 296 to the ratchet wheel 290.

The ratchet 290 has a notch or shoulder 300 positioned for engagement by the end of a control latch 301 pivoted at 302 (Fig. 6) on arms 303 projecting upward from a diaphragm valve casing 304. A diaphragm 305 is mounted in the casing 304 and carries a plunger 306 engaging the latch 301 near the pivot or axis thereof. The chamber beneath the diaphragm 305 is connected by a pipe 310 to the pipe 264 which extends from the four-way valve to the top of the wedge-controlling cylinder 259.

A spring 312 (Fig. 19) has a lower plug or head 313 engaging the top of the latch 301 and an upper plug or head 314 engaged by an adjusting screw 315, threaded in a bracket 316 mounted on fixed posts or rods 317. The adjusting screw is provided with a handle 318 and with graduations 319 cooperating with an index plate 320. By turning the screw 315 the pressure of the spring 312 on the latch 301 may be regulated for a purpose to be described.

A spring 321 (Fig. 6) is mounted on a guide-rod 322 extending upward from the rack bar 285 and acts to yieldingly force the rack bar downward. A bracket 323 receives the upward thrust of the spring 321. A handle 325 (Fig. 18) is pivoted at 326 and projects under the latch 301 for releasing the ratchet 290 manually when so desired.

Operation of the wedge control mechanism

The wedge control mechanism above described operates as follows:

The cams 60 and 61 (Fig. 6 and 20) rotate in unison with the main cam shaft. The valve 275 is normally positioned at right angles to the position shown in Fig. 21, connecting the inlet pipe 111 through the pipe 271, the control casing 270, and the pipe 265 to the bottom of the wedge control cylinder 259 and similarly connecting the upper end of the cylinder through the pipe 264, control casing 270, and pipe 272 to the outlet pipe 112. The piston 258 (Fig. 22) is thus normally raised, retracting the wedge 250 from operative position.

As the cams 60 and 61 (Fig. 20) rotate, the rack bar 285 is raised to its highest position, causing the valve 275 to be rotated to the position shown in Fig. 21, and positioning the notch 300 for engagement by the latch 301, thus holding the valve in open position. In this position, the inlet pipe 111 (Fig. 6) is connected through the pipes 271 and 264 to the top of the cylinder 259 and the outlet pipe 112 is connected through the pipes 272 and 265 to the lower end of said cylinder, thus causing the piston 258 to move downward, and carrying with it the wedge 250.

It will be noted that the pipe 310 (Fig. 6) connects the chamber beneath the diaphragm 305 to the pipe 264 which at this time connects the inlet 111 to the upper end of the cylinder 259. Inlet pressure is thus applied under the diaphragm 305, where sufficient pressure is in time built up to overcome the spring 312 (Fig. 19) and raise the latch 301, releasing the ratchet wheel 290. The time interval between the locking of the ratchet wheel 290 by the latch 301 and the release thereof may be varied and adjusted by varying the pressure of the spring 312 (Fig. 19) by turning the adjusting screw 315, the amount of adjustment being indicated by the graduations 319.

This initial movement of the wedge 250 forces the cam plate 242 to swing to the left in Fig. 23 and rocks the arm 240 and shaft 165 to raise the scarfing knife 44 against the under surface of the belt to be scarfed. The pressure against the under side of the belt is determined by the setting of the spring 312 and may be made greater or less as desired. As soon as the pressure equals the spring setting, the diaphragm is lifted to trip the latch 301. This initial pressure is preferably so adjusted as to force the knife a very short distance almost directly upward into the leather at the very beginning of the cut, forming a slight depression as indicated at 330 in Fig. 2. This is termed "throating" and provides a place for seating the thin edge of the scarf on the belt to be joined thereto.

When the latch 301 is elevated, the springs 293 (Fig. 19) and 321 (Fig. 20) act instantly to turn the valve 275 to a substantially horizontal position, in which the connections 264 and 265 to the cylinder 259 are both closed, thus holding the piston 258 in fixed vertical position and correspondingly positioning the wedge 250. The valve 275 is held in this position by engagement of the second stud 288 (Fig. 6) in the rack bar 285 with a concentric portion of the smaller and lower cam 61 (Fig. 20).

The wedge 250 (Fig. 23) thus remains in fixed position relative to the cam plate 242 until the scarfing cut is completed, when the cam 61 (Fig. 20) releases the rack bar 285, which then returns to its initial position, reversing the cylinder connections and causing the wedge to be moved upward to its normal or inoperative position. The length of the scarf is determined largely by the length of the spacing member 225$^a$ (Fig. 22), which determines the lower limit of travel of the cam plate 242. The beveled lower end of the cam plate 242 relieves the pressure 242$^a$ on the knife as soon as the axis of the cam plate 242 is raised above the axis of the roll 241. This prevents the knife from jumping upward and engaging the feed roll at the end of the cut.

Longitudinal belt positioning

We have made special provision for accurately positioning the belts longitudinally relative to the scarfing knife. For this purpose we provide a guide-plate 340 (Fig. 25) extending longitudinally of the feed rolls 41 and 42 and having its outer end 341 curved outward for engagement with the ends of the belts as they are fed under the feed rolls by the table feeding mechanism. The guide-bar slides the belts slightly toward the knife edge if necessary to bring them to the exact desired position for scarfing.

The guide-bar 340 rests on a supporting plate or table 342 (Fig. 27) adjacent the feed rolls, and is positioned by rack bars 343 extending laterally from the guide-bar 340 and provided with teeth 344 (Fig. 29) engaged by pinions 345 on a cross shaft 346 (Fig. 25). The cross shaft is supported in brackets 347 clamped to the upright posts 161 (Fig. 29) and is provided with a disc or hand wheel 348 (Fig. 25) by which it may be conveniently rotated.

A graduated disc 349 is also mounted on the shaft 346 for rotation adjacent an index finger 350. This construction provides for convenient adjustment of the guide-bar 340 toward and from the scarfing knife to any desired position, which may be determined by the graduations on the disc 349.

General operation

Having described the details of construction of our improved invention and having described the operation of the several parts, it is believed that an extended description of the operation of the entire machine will be unnecessary.

The table feeding mechanism operates intermittently to advance the pieces of belt singly between the feed rolls 41 and 42. The control valve mechanism operates to advance the wedge 250 to the desired point for positioning the cam plate 242. The cylinder is then locked by the control valve to hold the wedge in adjusted position and the cylinder, wedge and cam plate are thereafter depressed bodily, moving the cam plate 242 past the roll 241. These successive movements of the wedge and cam plate rock the shaft 165 to raise the lower feed roll 42 and the skiving knife 44 against the lower side of the belt B, and to feed the knife upward during the scarfing operation. The feed rolls are meanwhile rotated, forcing the belt against the edge of the knife 44 to form the scarfing cut.

The belt is then further withdrawn by the roll 45 and is thereby restored to the table feeding mechanism, by which it is pushed along and finally inverted and piled below the rear edge of the table.

The machine is entirely automatic, it being merely necessary to keep a sufficient supply of belts on the feed table.

Having thus described our invention and the advantages thereof, we do not wish to be limited to the details herein disclosed, otherwise than as set forth in the claims, but what we claim is:

1. A scarfing machine comprising a scarfing knife, means to feed a piece of belt lengthwise past said knife, and means to vary the vertical position of said knife as said belt is moved lengthwise, all parts of said knife being moved equally and simultaneously and in the same direction to effect a uniform scarfing cut throughout the width of the belt.

2. A scarfing machine comprising a scarfing knife, fluid-operated means to cause an initial pressure of said knife against the work, and means to vary the duration of operation of said fluid-operated means.

3. A scarfing machine comprising a scarfing knife, a fluid-operated piston connected to control the initial pressure of said knife on the work, a cylinder for said piston, and means to lock said piston in adjusted position in said cylinder.

4. A scarfing machine comprising a scarfing knife, a rock shaft connected to move said knife to scarfing position, a cam member controlling the rocking of said shaft, and automatic means to set said cam member at the beginning of each actuation of said machine.

5. In a scarfing machine, a scarfing knife, feeding means effective to present belts singly to said knife, and means to grip and withdraw said belts past said knife, said feeding means being thereafter effective to eject said belts from said machine.

6. In a scarfing machine, a scarfing knife, feeding means effective to present belts singly to said knife, means to grip and withdraw said belts past said knife, and means to move said belts endwise after the scarfing operation, said feeding means being thereafter effective to eject said belts from said machine.

7. In a scarfing machine, a scarfing knife, feeding means effective to present belts singly to said knife, and means to grip and withdraw said belts past said knife, said feeding means being also effective to stack said belts in inverted position after the scarfing operation thereon.

8. In a scarfing machine, belt presenting mechanism, belt gripping and endwise feeding mechanism, belt withdrawing mechanism, and cam-controlled fluid-operated means for rendering said several mechanisms operative in timed relation to each other.

9. A belt scarfing machine comprising a scarfing knife, a pair of feed rolls positioned adjacent the edge of said knife and above and below the belt to be scarfed, means to cause said rolls to grip said belt, and means to intermittently rotate said rolls to draw said belt past said scarfing knife, and means to raise said knife as the rolls rotate, whereby a bevelled scarfing cut is attained.

10. In a scarfing machine, a scarfing knife, a pair of feed rolls associated therewith, one of said rolls being mounted in fixed vertical position, a movable support for said knife, said second feed roll being mounted on said movable support, and a positive gear drive between said feed rolls, operative in every relative position thereof.

11. In a scarfing machine, a scarfing knife, upper and lower feed rolls associated therewith, said upper roll being mounted to rotate in fixed vertical position, means to intermittently advance said upper feed roll, means to raise and lower said lower feed roll, and positive gear connections between said rolls, operative in every relative position thereof.

12. In a scarfing machine, a scarfing knife, upper and lower feed rolls associated therewith, said upper roll being mounted to rotate in fixed vertical position, a ratchet wheel fast on said upper feed roll, a pinion loose thereon and carrying a pawl engaging said ratchet wheel, a rack bar engaging said pinion, and fluid-actuated means to reciprocate said rack bar and thereby intermittently rotate said feed roll in one direction only.

13. In a scarfing machine, a scarfing knife, upper and lower feed rolls associated therewith, said upper roll being mounted to rotate in fixed vertical position, a rack bar connected to intermittently advance said feed roll, and means movable with said rack bar effective to cause upward movement of said scarfing knife.

14. In a scarfing machine, a scarfing knife, and means to raise said scarfing knife to operative position during the scarfing operation, said means including a rock shaft, a cam roll thereon, a cam plate engaging said roll, and means to move said cam plate relative to said cam roll.

15. In a scarfing machine, a scarfing knife, and means to raise said scarfing knife to operative position during the scarfing operation, said means including a rock shaft, a cam roll thereon, a cam plate engaging said roll, a wedge determining the operative position of said cam plate, fluid controlled means to position said wedge, and means to move said cam plate and wedge relative to said cam roll.

16. In a scarfing machine, a scarfing knife, fluid-operated positioning mechanism therefor, a rotary valve controlling said positioning mechanism, a latch for said valve, and fluid actuated means to release said latch.

17. In a scarfing machine, a scarfing knife, fluid-operated positioning mechanism therefor, a rotary valve controlling said positioning mechanism, a latch for said valve, fluid actuated means to release said latch, and manual means to vary the operation of said releasing means.

18. In a scarfing machine, a scarfing knife, fluid-operated mechanism therefor, a rotary valve controlling said positioning mechanism, a latch for said valve, fluid actuated means to release said latch, a spring resisting the operation of said releasing means, and means to adjust said spring.

19. A scarfing machine comprising a scarfing knife, means to feed a belt sidewise to scarfing position relative to said knife, means to position said belt endwise in scarfing position, and means to feed said belt past said knife during the scarfing operation.

20. A scarfing machine comprising a scarfing knife, means to feed a belt sidewise to scarfing position relative to said knife, a fixed adjustable guide extending parallel to said scarfing knife and having the entering end portion thereof set back to engage and align a belt fed sidewise thereto, and means to feed said belt past said knife during the scarfing operation.

In testimony whereof we have hereunto affixed our signatures.

EDWARD H. HATHAWAY.
WINFRED S. GRIFFITH.